(12) United States Patent
Beus

(10) Patent No.: US 11,194,531 B1
(45) Date of Patent: Dec. 7, 2021

(54) SELF-ORGANIZING FAULT-TOLERANT DISTRIBUTED PRINTING USING BLOCKCHAIN

(71) Applicant: KYOCERA Document Solutions, Inc., Osaka (JP)

(72) Inventor: Eric de Beus, Redondo Beach, CA (US)

(73) Assignee: KYOCERA Document Solutions, Inc., Osaka (JP)

( * ) Notice: Subject to any disclaimer, the term of this patent is extended or adjusted under 35 U.S.C. 154(b) by 0 days.

(21) Appl. No.: 16/888,399

(22) Filed: May 29, 2020

(51) Int. Cl.
*G06F 3/12* (2006.01)
*H04L 9/06* (2006.01)

(52) U.S. Cl.
CPC .......... *G06F 3/1241* (2013.01); *G06F 3/1205* (2013.01); *G06F 3/1259* (2013.01); *G06F 3/1261* (2013.01); *G06F 3/1262* (2013.01); *G06F 3/1274* (2013.01); *G06F 3/1291* (2013.01); *H04L 9/0643* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 6,539,181 B2 | 3/2003 | Hull | |
| 6,971,809 B1 | 12/2005 | Housel et al. | |
| 7,315,396 B2 | 1/2008 | Bergstrand et al. | |
| 7,558,500 B2 | 7/2009 | Shibata | |
| 7,619,772 B2 | 11/2009 | Fukudome | |
| 8,218,161 B2 | 7/2012 | Mizutani et al. | |
| 8,526,029 B2 | 9/2013 | Yasukawa et al. | |
| 9,146,698 B2 | 9/2015 | Fukui | |
| 9,699,357 B1 | 7/2017 | Das et al. | |
| 10,235,105 B1* | 3/2019 | Waller | G06F 3/1285 |
| 10,725,716 B1* | 7/2020 | de Beus | G06F 3/1243 |
| 2002/0101607 A1 | 8/2002 | Hull | |
| 2002/0184137 A1* | 12/2002 | Oakeson | G06Q 10/10 705/37 |
| 2007/0229880 A1* | 10/2007 | Harmon | G06F 3/1241 358/1.15 |
| 2012/0050796 A1* | 3/2012 | Yokokura | G06F 3/1241 358/1.15 |
| 2016/0210091 A1* | 7/2016 | Martin | G06F 3/1288 |
| 2018/0094953 A1* | 4/2018 | Colson | G06F 1/3287 |
| 2019/0268162 A1* | 8/2019 | Sahagun | H04L 9/0891 |
| 2019/0278254 A1* | 9/2019 | Kumar | G05B 19/4099 |
| 2020/0137238 A1* | 4/2020 | Sabandith | G06Q 20/389 |

\* cited by examiner

*Primary Examiner* — Henok Shiferaw
(74) *Attorney, Agent, or Firm* — Rowan TELS LLC

(57) ABSTRACT

A self-organizing, distributed printing system utilizes a plurality of digital front ends coupled to to printers and configured to periodically poll a distributed electronic ledger for a print job. Each digital front end adds a bid block to the distributed electronic ledger requesting a page range of the print job to be allocated to the digital front end for printing; and further adds a vote block to the distributed electronic ledger to approve or deny a bid block for the page range added to the distributed electronic ledger by other of the digital front ends; and further may release all or part of a page range allocated to the digital front end back to the distributed electronic ledger in response to a print failure by a printer associated with the digital front end.

19 Claims, 8 Drawing Sheets

SELF-ORGANIZING FAULT-TOLERANT DISTRIBUTED PRINTING USING BLOCKCHAIN

BACKGROUND

Some production print jobs may include hundreds of thousands of records and millions of pages, and can even be of indefinite length if they're being generated programmatically. Page order and record order should be maintained in the printing and finishing of these jobs. For efficiency, large jobs are sometimes printed via distributed printing systems, with the work split among multiple print devices.

There are existing distributed printing systems in which large print jobs are split into job sections and those job sections are distributed among multiple devices, either by utilizing a controlling device feeding job sections to the devices, or by a controlling device sending notifications to multiple devices and feeding the job sections to the devices as they respond with their availability. Job sections are typically identified by cover sheets printed with the job, with identifying information in human-readable or machine-readable form so that the jobs can be assembled and collated.

An ongoing need therefore exists in the art for an automated, fault-tolerant, coordinated distributed printing system for large jobs, with a reliable audit trail tracking the job sections, enabled to handle indefinite-length jobs.

BRIEF SUMMARY

A self-organizing distributed printing system includes a plurality of printers, a distributed electronic ledger, and a plurality of digital front ends coupled to the printers and configured to periodically poll the distributed electronic ledger for a print job. Each digital front end of the plurality of digital front ends includes logic to perform actions related to the operation of the self-organizing distributed printing system. Each digital front end may include logic to add a bid block to the distributed electronic ledger, where the bid block requests a page range of the print job to be allocated to the digital front end for printing. Each digital front may include logic to add a vote block to the distributed electronic ledger to approve or deny a bid block for the page range added to the distributed electronic ledger by other of the digital front ends. Each of the digital front ends may include logic to release all or part of a page range allocated to the digital front end back to the distributed electronic ledger in response to a print failure by a printer associated with the digital front end.

A self-organizing distributed printing process involves adding a print job definition block to a distributed electronic ledger by a job originator. A plurality of printing systems may poll the distributed electronic ledger for the print job definition block. The plurality of printing systems bid on the distributed electronic ledger for page ranges of the print job. The bidding occurs between the plurality of printing systems by adding, approving, and denying bid blocks on the distributed electronic ledger. The page ranges of the print job may be allocated to the plurality of printing systems based on an outcome of the bidding. One or more of the plurality of printing systems may cancel at least part of a page range acquired by one or more of the plurality of printing systems. The printing systems may poll the distributed electronic ledger to identify canceled page ranges. Printing systems respond to the canceled page range by reinitiating bidding, on the distributed electronic ledger, for a canceled part of the page range.

A printing system includes a printer and digital front end coupled to the printer. The digital front end may be configured to periodically poll a distributed electronic ledger for a print job. The digital front may be configured to negotiate with other printing systems for rights to print a page range of the print job, the negotiating performed exclusively on the distributed electronic ledger. The digital front end may be configured to release all or part of the page range back to the distributed electronic ledger in response to a paper jam.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
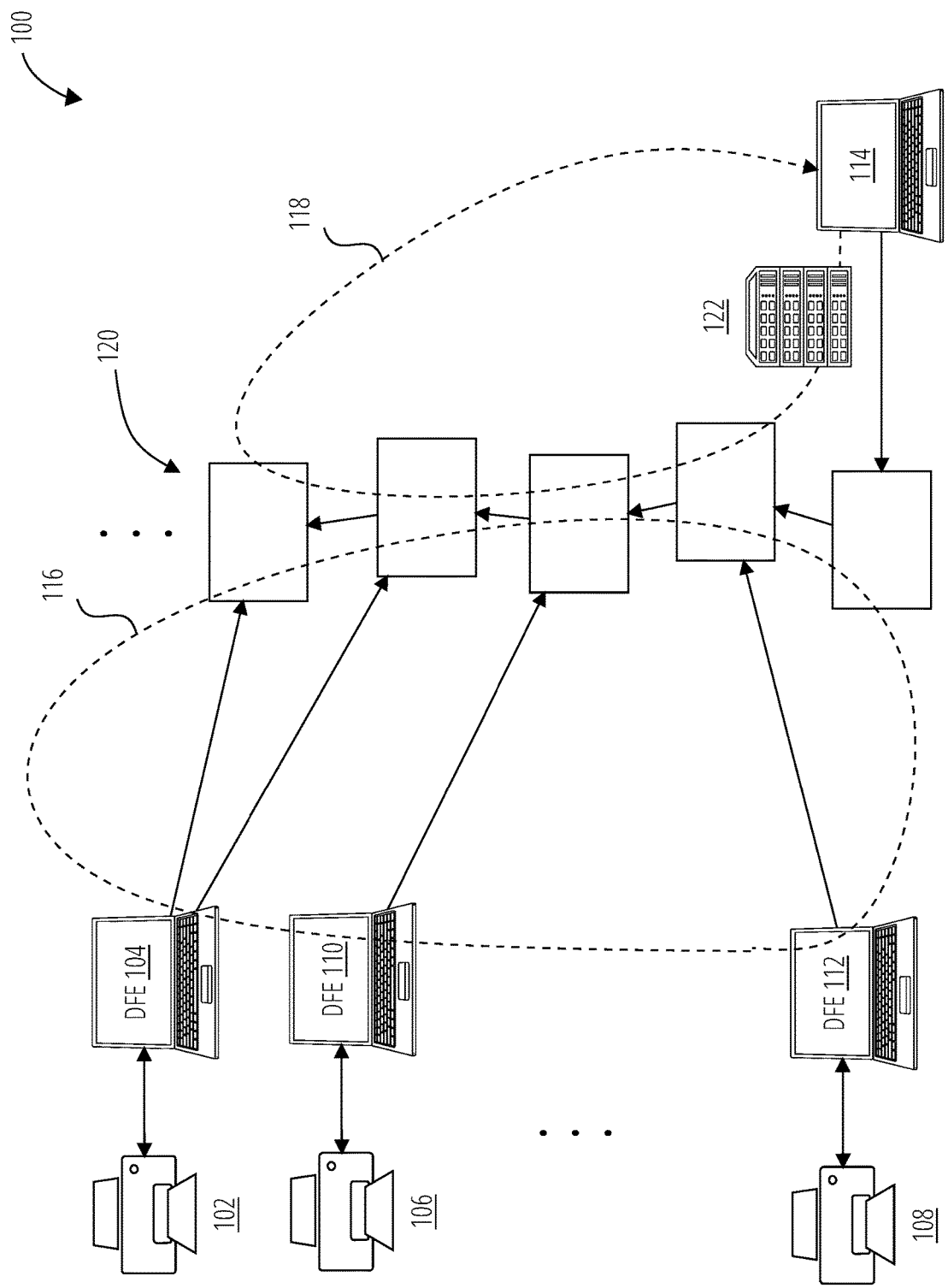
FIG. 1 depicts a distributed printing system 100 in accordance with one embodiment.

A system utilizes a private distributed electronic ledger enabling controlled access to print jobs to devices within a print shop, or within a network of print shops. "Print shop" refers to a physical location of a printing system. "Distributed electronic ledger" refers to a system for recording actions and transactions in which the actions/transactions and their details are recorded in multiple digital storage devices redundantly and not with complete centralized redundancy (every transaction/action may not be recorded at all storage locations). Unlike traditional databases, distributed ledgers have no central data store or control or administration functionality. Instead, the participating devices in the actions and transactions cooperate to control and administer a distributed electronic ledger.

"Participating device" refers to any device or system (printers, print servers, digital front ends etc.) that participates in the printing of a print job. "Print job" refers to the specification of a document or documents to print, possibly along with constraints one time, cost, locality, materials etc.

The participating devices in the print job are the print server(s) and digital front ends. "Digital front end" refers to a computing device that receives print jobs or portions of print jobs (e.g., page ranges) and interacts with a printer to carry out printing of the print job or portion thereof. A digital front end may typically include a human user interface for the input of control settings and status indications, but this is not required in all cases. The privacy of the distributed electronic ledger obviates the need for proof-of-work calculations. Transactions on the distributed electronic ledger may be verified by a vote of the majority of the participating digital front ends.

The distributed electronic ledger enables self-organizing, distributed control of print jobs, fault-tolerance, time-ordered tracking of job sections, and auditability, as well as obviating the need for a master device that continuously controls and monitors the print jobs. "Job section" refers to one or more page ranges. "Page range" refers to a set of pages, which may be contiguous pages in a print job or non-contiguous sets (e.g., print odd pages of the print job, or print every fifth page, etc. Print ranges may also be specified by classifiers such as "pages with graphics", "pages with tabs", and so on. Once a job-start transaction is posted to the distributed electronic ledger by the job originator, participating devices may autonomously take assignment of job sections until the print job originator posts a job-end transaction to the distributed electronic ledger. "Print job originator" refers to a device that submits a print job for printing. This process is tolerant of downtime by any of the individual participating devices, and enables a variable number of devices to participate at any point during execution of the print job, per their available processing time. Participating devices may operate in parallel on a print job of indefinite length. The distributed electronic ledger may encode a detailed history of the job, including where and when each job segment was printed, each segment's job id, assigned print device, and other metadata as per the implementation.

The print job data may be stored on a print job server that the participating devices access to request job sections. "Print job server" refers to a device or system that intermediates the printing of print jobs between one or more print job originator and the printing systems that carry out the printing. The print job server may be the same device as the print job originator, or may be the same device as one of the participating devices, or may be a distinct device from these other devices. The print job server may split a job into sections defined by a page range, or by a plurality of pages or page ranges, which enables participating devices to request job sections defined as, for example, all or particular landscape pages, or all or particular pages to be printed on a particular stock. Participating devices may store a local copy of the job section they are currently processing, or a portion of it, or they may prefetch a larger part of the job beyond their current portion. The splitting and reassembly of a print job may be defined and controlled exclusively by the distributed electronic ledger, wherein the participating devices are trusted to autonomously self-assign any number of pages for printing from the print job server.

The distributed electronic ledger may implement smart contracts, including five contract functions:
1. For print job originators to start a print job.
2. For print job originators to end a print job.
3. For print job contractors to acquire a job section (e.g., page range).
4. For print job contractors to release a job section.
5. For print job contractors to report the completion of a job section.

The print job originator activates the first function to start a print job, entering details to be stored in the distributed electronic ledger. Exemplary contract data for this function is:
  Job ID at originating node.
  Job constraints: the minimum and maximum size of job sections that may be acquired by a participating device, and any required capabilities of a participating device for the print job.
  Job information: information utilized (e.g., data server URL) to retrieve the job content.

This information may be added as a block in the distributed electronic ledger, and the print job originator receives an identifier for the transaction.

The participating devices, i.e., any print server node that is authorized on the distributed electronic ledger and has available job processing time, may operate the smart contract's third, fourth, and fifth functions to acquire the next available job section, and to report the completion of a job section. The contract data for these functions may be:
  Job ID at participating device node.
  Identifying information for the participating device: device description, location, and network address.
  Page information for the job section: page range, or list of pages or page ranges.

When a participating device has acquired a section of pages, it accesses the print job server to obtain the page data.

The print job originator applies the second function to close the print job as a transaction added as a block in the distributed electronic ledger. After a print job is closed, the print job originator may query the distributed electronic ledger to audit the print job. The contract data for the second function may be:
  Job ID at print job originator node For example, a first participating device may acquire and complete two job sections, while a second participating device acquires a job section that it is unable to complete (e.g., because of a paper jam), and releases them back to the distributed electronic ledger. The print job originator periodically monitors the distributed electronic ledger to track the progress of the print job.

FIG. 1 depicts a distributed printing system 100 in accordance with one embodiment. The distributed printing system 100 comprises a plurality of printers (printer 102, printer 106, and printer 108), a plurality of digital front ends (DFE) (digital front end 104, a digital front end 110, and digital front end 112), and a distributed electronic ledger 120. The plurality of digital front ends are coupled to the plurality of printers, such that the printer 102, the printer 106, and the printer 108, are coupled to the digital front end 104, the digital front end 110, and the digital front end 112, respectively. These couplings between the printer and a digital front end forms a printing system. The plurality of digital front ends are configured to periodically poll the distributed electronic ledger 120 for a print job in the form of a print job definition block added by a print job originator 114. A print job server 122 may optionally be utilized to facilitate the distribution of the print job among the printing systems. This polling is visualized in the independent DFE polling loop 116 where the plurality of digital front ends poll the distributed electronic ledger 120.

Each of the digital front ends (digital front end 104, digital front end 110, and digital front end 112) of the plurality of digital front ends comprise logic to add a bid block to the distributed electronic ledger 120, the bid block requesting a page range of the print job to be allocated to the digital front end for printing. For example, each digital front (digital front end 104, digital front end 110, and digital front end 112) may add a bid block to the distributed electronic ledger 120 during the independent DFE polling loop 116.

Each of the digital front ends comprise logic to add a vote block to the distributed electronic ledger 120 and to approve or deny a bid block for a page range added to the distributed electronic ledger 120 by other of the digital front ends. For example, digital front end 104 may add a vote block to the distributed electronic ledger 120 to deny the page range bid upon by the digital front end 112 during the independent DFE polling loop 116.

Each of the digital front ends comprise logic to release all or part of a page range allocated to the digital front end back to the distributed electronic ledger 120 in response to a print failure by a printer associated with the digital front end. For example, the printer 102 may experience a failure, such as a paper jam or other printing issue, and the associated digital front end 104 may interact with the distributed electronic ledger 120 to release all or part of the page ranges allocated to the digital front end 104.

In the self-organizing distributed printing system 100 vote blocks for a bid block may be added to the distributed electronic ledger 120 by all or some of the participating devices to approve or deny a bid block. Allocation of a job section bid upon may be affirmed and completed based on a majority vote or a plurality of the vote, for example.

In the self-organizing distributed printing system 100, all or part of a page range or job section allocated to a digital front end may be released back to the distributed electronic ledger 120 in response to a print failure by the participating device assigned to the page range. This process may involve a digital front end adding a page range release block for all or part of the page range or job section to the distributed electronic ledger 120. Each of the digital front ends may comprise logic to poll the distributed electronic ledger 120 to detect a page range release block and in response to detecting the page range release block, to add a bid block for the released page range to the distributed electronic ledger 120.

In the self-organizing distributed printing system 100, the digital front ends may comprise logic to add a page range or job section completion block to the distributed electronic ledger 120 in response to completion of printing of the page range or job section allocated to the digital front end. The logic may add a bid block to the distributed electronic ledger 120 for an additional page range or job section of the print job to be allocated to the digital front end for printing.

The digital front ends may comprise logic to poll the distributed electronic ledger 120 to identify at least one vote block added by the other digital front ends indicating that the other digital front ends approve the bid block requesting a page range or job section of the print job to be allocated to the digital front end for printing.

In some embodiments of the self-organizing distributed printing system 100, the distributed electronic ledger 120 may comprise a single mainchain without sidechains. Mainchains and sidechains are well known features of blockchains, a practical implementation of distributed electronic ledgers well known in the art. The described embodiments form a system in which the timing, transactions, and blocks generated by the participating devices on the distributed electronic ledger generate only a single mainchain without sidechains, leading to greater efficiency and performance and reduced likelihood or errors, inconsistencies, or race conditions, due to the simpler distributed electronic ledger structure thus utilized.

The distributed electronic ledger 120 may comprise a job definition block defining constraints on page ranges or job sections that may be bid on by the digital front ends. In some configurations, the constraints comprise minimum and maximum page counts. The constraints may also comprise price constraints. Additionally, the constraints may comprise completion time constraints.

The distributed printing system 100 may be operated in accordance with a self-organizing distributed printing process. The process may involve adding a print job definition block to a distributed electronic ledger 120 by a print job originator 114. The print job definition block may be added during a job originator polling loop 118. A plurality of printing systems (e.g., printer 102, printer 106, and printer 108 coupled with digital front end 104, digital front end 110, and digital front end 112) may poll the distributed electronic ledger 120 for the print job definition block during the independent DFE polling loop 116. The plurality of printing systems may bid on the distributed electronic ledger 120 for page ranges of the print job. The bidding occurs between the plurality of printing systems by adding, approving, and denying bid blocks on the distributed electronic ledger 120. The page ranges of the print job may then be allocated to the plurality of printing systems based on an outcome of the bidding. one or more of the plurality of printing systems may cancel at least part of a page range acquired by the bidding on the distributed electronic ledger 120. One or more of the printing systems may identify a canceled page range or portion thereof by polling the distributed electronic ledger 120. One or more of the printing systems may respond to the canceled page range by reinitiating bidding, on the distributed electronic ledger 120, for at least a canceled part of the page range.

In the self-organizing distributed printing process for the distributed printing system 100, canceling of the at least part of the page range acquired by the bidding may occur in response to a paper jam by a printing system that acquired the page range by the bidding.

The self-organizing distributed printing process for the distributed printing system 100 may further involve one or more of the printing systems responding to the canceling of less than an entire page range by reinitiating, on the distributed electronic ledger 120, bidding for the entire page range by the one or more of the plurality of printing systems.

The print job originator 114 may detect a bidding deadlock among one or more of the printing systems by polling the distributed electronic ledger 120 (job originator polling loop 118). The print job originator 114 may break the deadlock by adding a page range assignment block to the distributed electronic ledger 120.

A bidding deadlock among one or more of the printing systems that is detected on the distributed electronic ledger 120 may be resolved via a contention resolution process among those of the printing systems causing the deadlock. The contention resolution process may exclude intervention by the print job originator 114. A contention resolution process may utilize random or pseudorandom assignment of a contentious page range to one of the contending printing systems, may involve progressive backoff in the bids until an agreed upon allocation of the page ranges is reached by the contending printing systems, may involve an automatic equal allocation of the contentious page range among the contending systems, or may involve an automatic agreement among the contending systems to allocate the contentious page range based on their respective capabilities or pro-rata availability. Other contention resolution systems based on voting schemes as known in the art may also be utilized.

The printing systems may add a page range completion block to the distributed electronic ledger 120 in response to completion of printing of a page range acquired by the printing systems. The print job originator 114 may add a job completion block to the distributed electronic ledger 120 in response to detecting page range completion blocks on the distributed electronic ledger 120 for the assigned page ranges of the print job.

Figure 2:
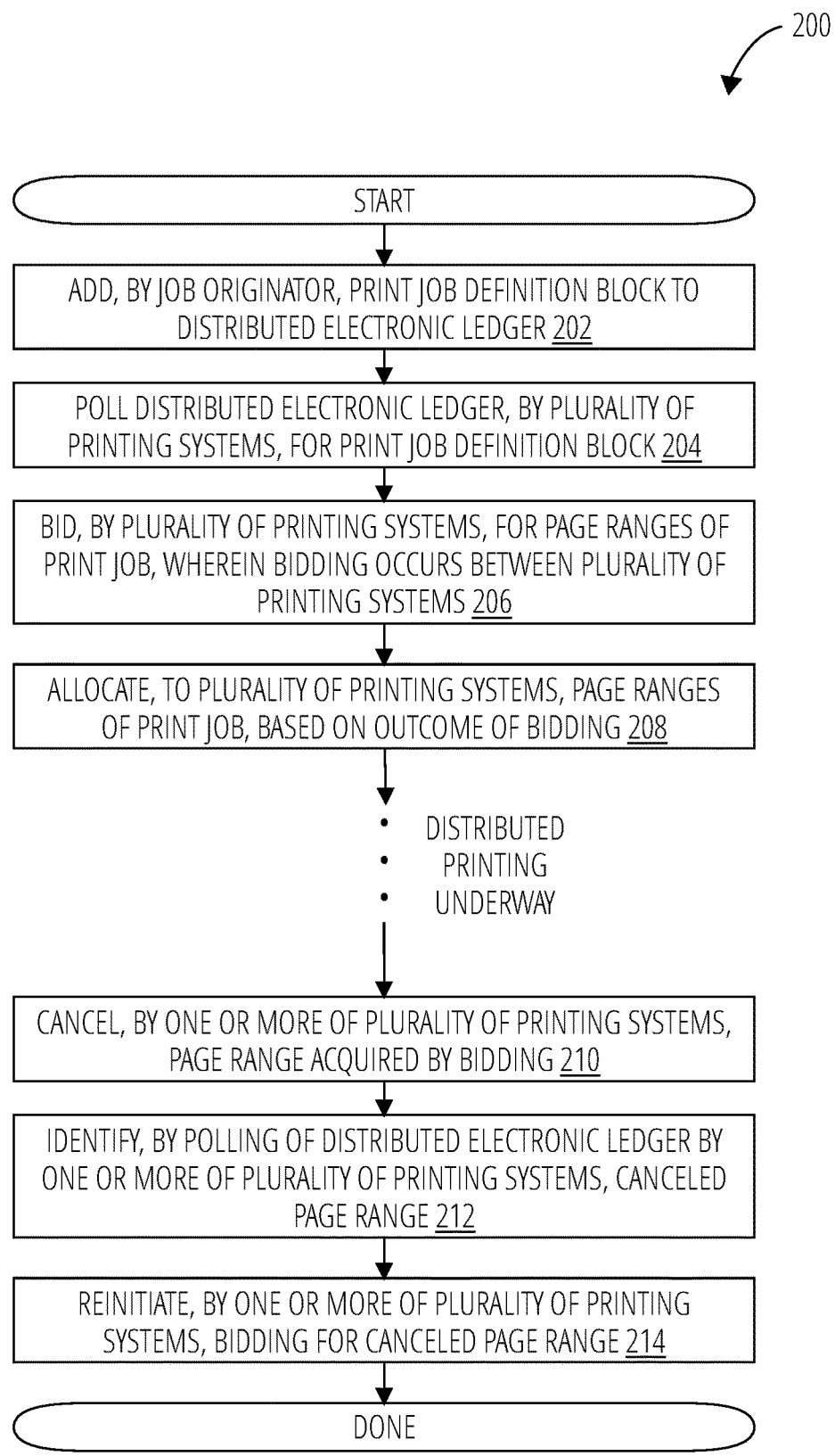
FIG. 2 depicts a self-organizing distributed printing process 200 in accordance with one embodiment.

FIG. 2 depicts a self-organizing distributed printing process 200 in one embodiment. At block 202, a job originator adds a print job definition block to a distributed electronic ledger. At block 204, the plurality of printing systems poll the distributed electronic ledger for print job definition block. At block 206, the plurality of printing systems bid between themselves for page ranges of the print job. At block 208, the plurality of printing systems are allocated page ranges of the print job based on the outcome of the bidding. A distributed printing process may commence following the allocation of the page ranges of the print job to the plurality of printing systems. At block 210, one or more of the plurality of printing systems may cancel the page range acquired by bidding. At block 212, the one or more of the plurality of printing systems identify cancelled page ranges by polling the distributed electronic ledger. At block 214, the one or more of the plurality of printing systems reinitiate bidding for the cancelled page range.

Figure 3:
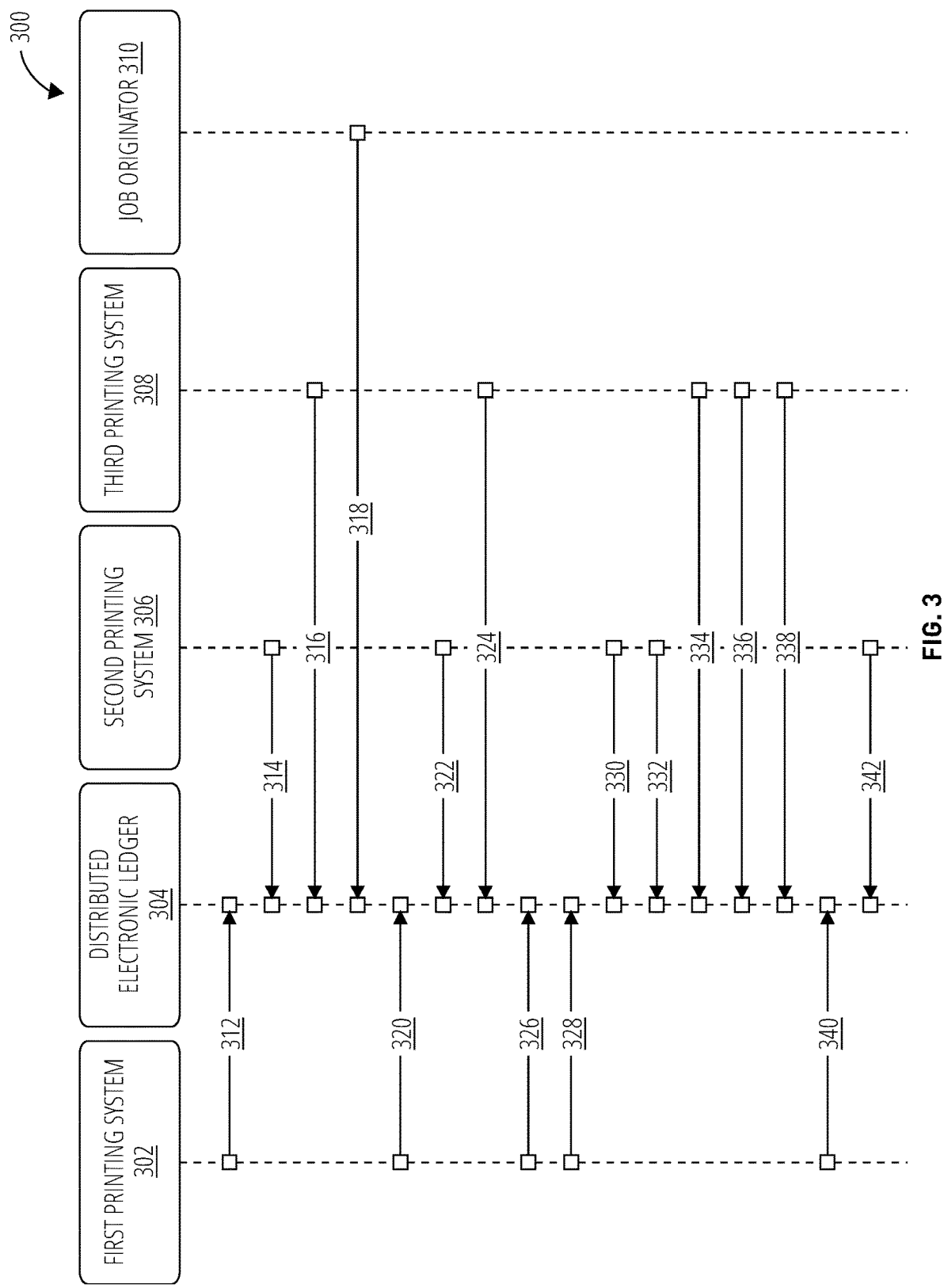
FIG. 3 depicts a print job allocation process 300 in accordance with one embodiment.

FIG. 3 depicts a sequence diagram for a print job allocation process 300 in one embodiment. The sequence diagram depicts a sequence of signals exchanged between a first printing system 302, distributed electronic ledger 304, second printing system 306, third printing system 308, and job originator 310.

The first printing system 302 polls for a print job 312 on distributed electronic ledger 304. The second printing system 306 also polls for a print job 314 on distributed electronic ledger 304, and likewise the third printing system 308 polls for a print job 316 on distributed electronic ledger 304.

The job originator 310 adds a print job block 318 to the distributed electronic ledger 304. The first printing system 302 then adds a bid block for a page range 320 to the distributed electronic ledger 304. The second printing system 306 also adds a bid block for the page range 322 to the distributed electronic ledger 304, and likewise the third printing system 308 adds a bid block for the page range 324 to the distributed electronic ledger 304.

The first printing system 302 approves the bid block of the second printing system 326 on the distributed electronic ledger 304. However the first printing system 302 declines the bid block of the third printing system 328. The second printing system 306 approves the bid block of the first printing system 330 on distributed electronic ledger 304. The second printing system 306 approves the bid block of the third printing system 332 and the third printing system 308 then approves the bid block of the first printing system 334 and further approves the bid block of the second printing system 336.

The third printing system 308 proposes a new bid for the page range 338 on the distributed electronic ledger 304. The first printing system 302 approves the bid block of the third printing system 340 and the second printing system 306 approves the bid block of the third printing system 342 to the distributed electronic ledger 304.

The various printing systems thus self-organize to print the print job in a distributed fashion.

Figure 4:
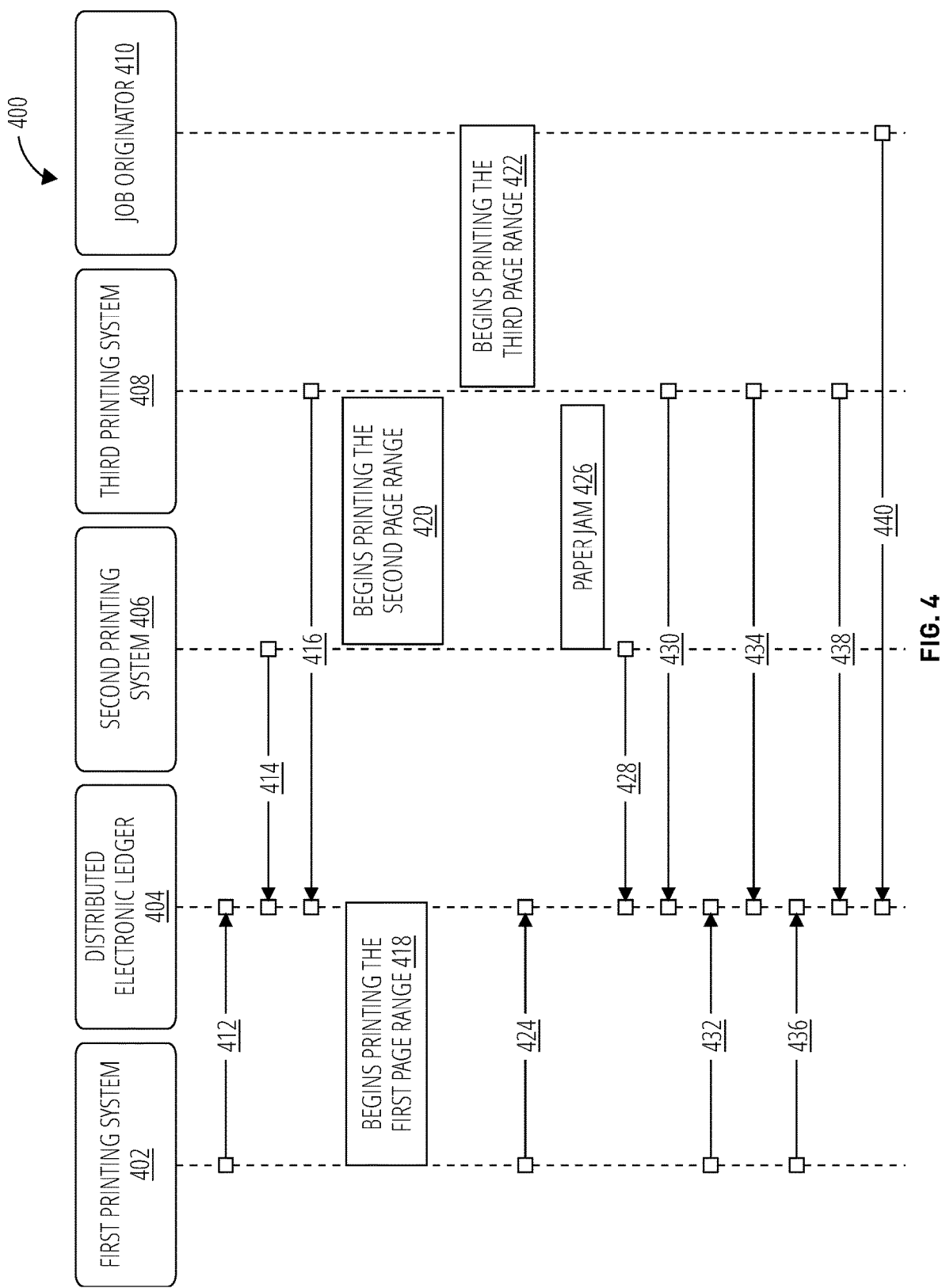
FIG. 4 depicts a print failure recovery process 400 in accordance with one embodiment.

FIG. 4 depicts a sequence diagram for a print failure recovery process 400 in one embodiment. The sequence diagram depicts a sequence of signals exchanged between a first printing system 402, a distributed electronic ledger 404, a second printing system 406, a third printing system 408, and a job originator 410.

The first printing system 402 acquires a first page range 412 from the distributed electronic ledger 404. The second printing system 406 acquires a second page range 414 from the distributed electronic ledger 404. The third printing system 408 acquires a third page range 416 to the distributed electronic ledger 404.

The first printing system 402 begins printing the first page range 418, the second printing system 406 begins printing the second page range 420, and the third printing system 408 begins printing the third page range 422. The first printing system 402 communicates that it has completed printing of the first page range 424 to the distributed electronic ledger 404. However, the second printing system 406 detects a paper jam 426 and indicates on the distributed electronic ledger 404 that it releases all or a portion of the second page range 428 to the distributed electronic ledger 404. The third printing system 408 then indicates to the distributed electronic ledger 404 that it has completed printing of the third page range 430.

The first printing system 402 submits a bid to complete printing of the second page range 432 to the distributed electronic ledger 404. The third printing system 408 also submits a bid to complete printing of the second page range 434 to the distributed electronic ledger 404. The first printing system 402 sets a block on the distributed electronic ledger 404 to deny the bid of the third printing system 436. The third printing system 408 also sets a block to deny the bid of first printing system 438. To break the deadlock, the job originator 410 sets a block on the distributed electronic ledger 404 to assign the second page range to the first printing system 440.

Figure 5:
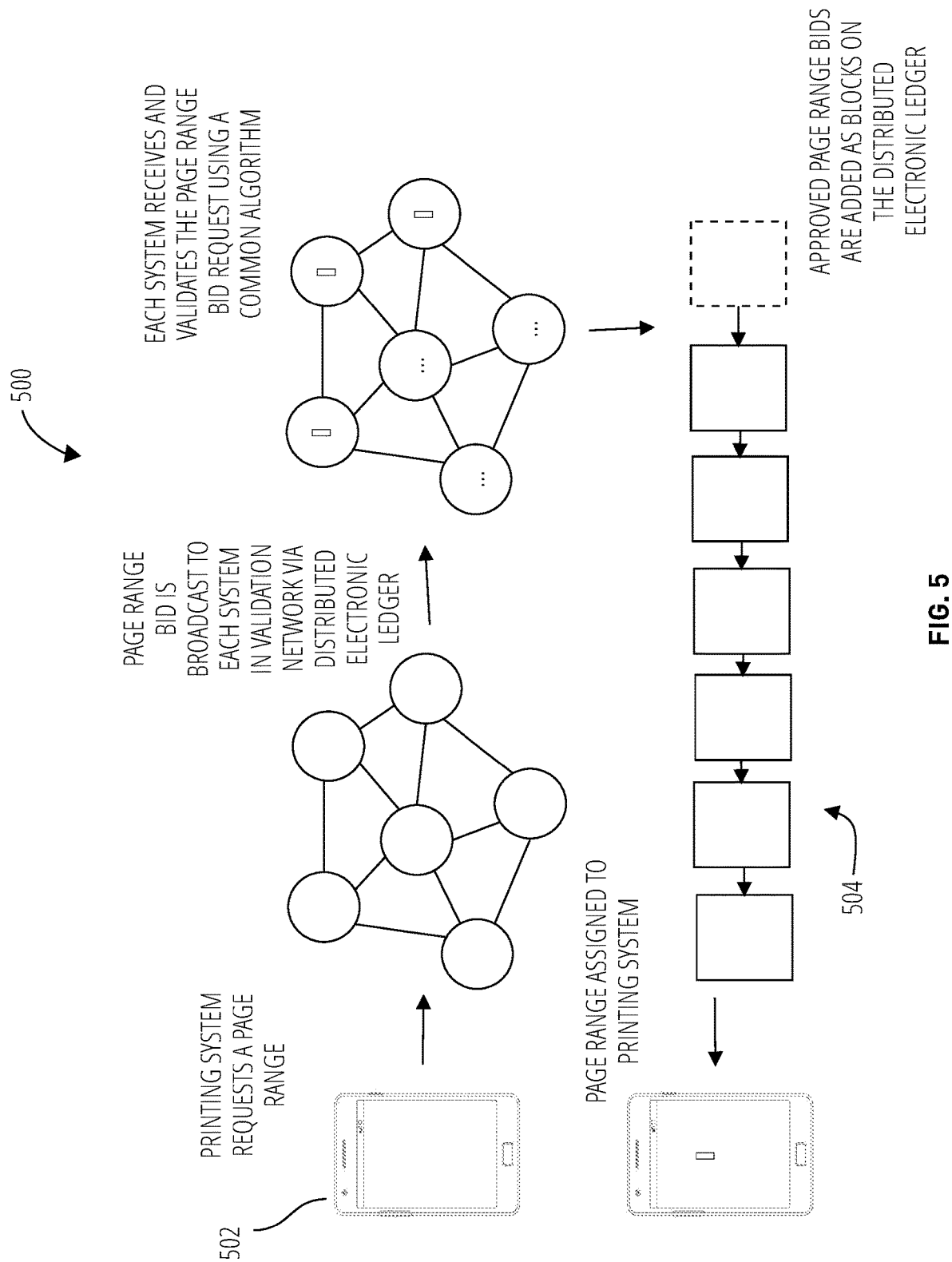
FIG. 5 depicts a page range allocation process 500 in accordance with one embodiment.

FIG. 5 depicts a distributed electronic ledger 504 utilized in as part of a page range allocation process 500. Each block records a transaction. These transactions may be submitted by a transaction requesting device 502. The distributed electronic ledger 504 distributes a print job server across a group of printing systems based on these transactions. The distributed electronic ledger 504 may be duplicated across many computer systems for redundancy and fault tolerance, or maintained on a single computer system.

The distributed electronic ledger 504 is a continuously growing list of records, called blocks, which are linked and secured using cryptography. Each block typically comprises a cryptographic hash of the previous block, a timestamp, and transaction data. The distributed electronic ledger 504 is resistant to modification of the data. The distributed electronic ledger 504 may thus record transactions between multiple parties efficiently and in a verifiable and permanent way.

The distributed electronic ledger 504 is managed by multiple devices that collectively adhere to a protocol for inter-node communication and validating new blocks. Once recorded, the data in any given block cannot be altered retroactively without alteration of subsequent blocks, which may require consensus among the parties.

Cryptography involving mathematical methods of keeping data secret and proving identity is utilized when recording transactions. One digital key restricts access such that only the owner may enter a transaction to the distributed electronic ledger 504 involving their assets, and another digital key lets other parties confirm it really was the owner who added the transaction.

The distributed electronic ledger 504 is resistant to tampering or other changes by utilizing a cryptographic technique called the hash. Hashing reduces data to a sequence of seemingly random characters—for example, the hash of the phrase "the quick brown fox" is "9ECB36561341D18EB65484E833EFEA61EDC74B84CF5E6AE1B81C63533E25FC8F"

using a hash method called SHA-256. Altering the phrase produces a different hash, and it is difficult to derive the original data from the hash.

Hashes are linked together so any minute is immediately visible, not only for the block comprising it but for other blocks added later. This facilitates auditing of the execution of print jobs by many printing systems.

Figure 6:
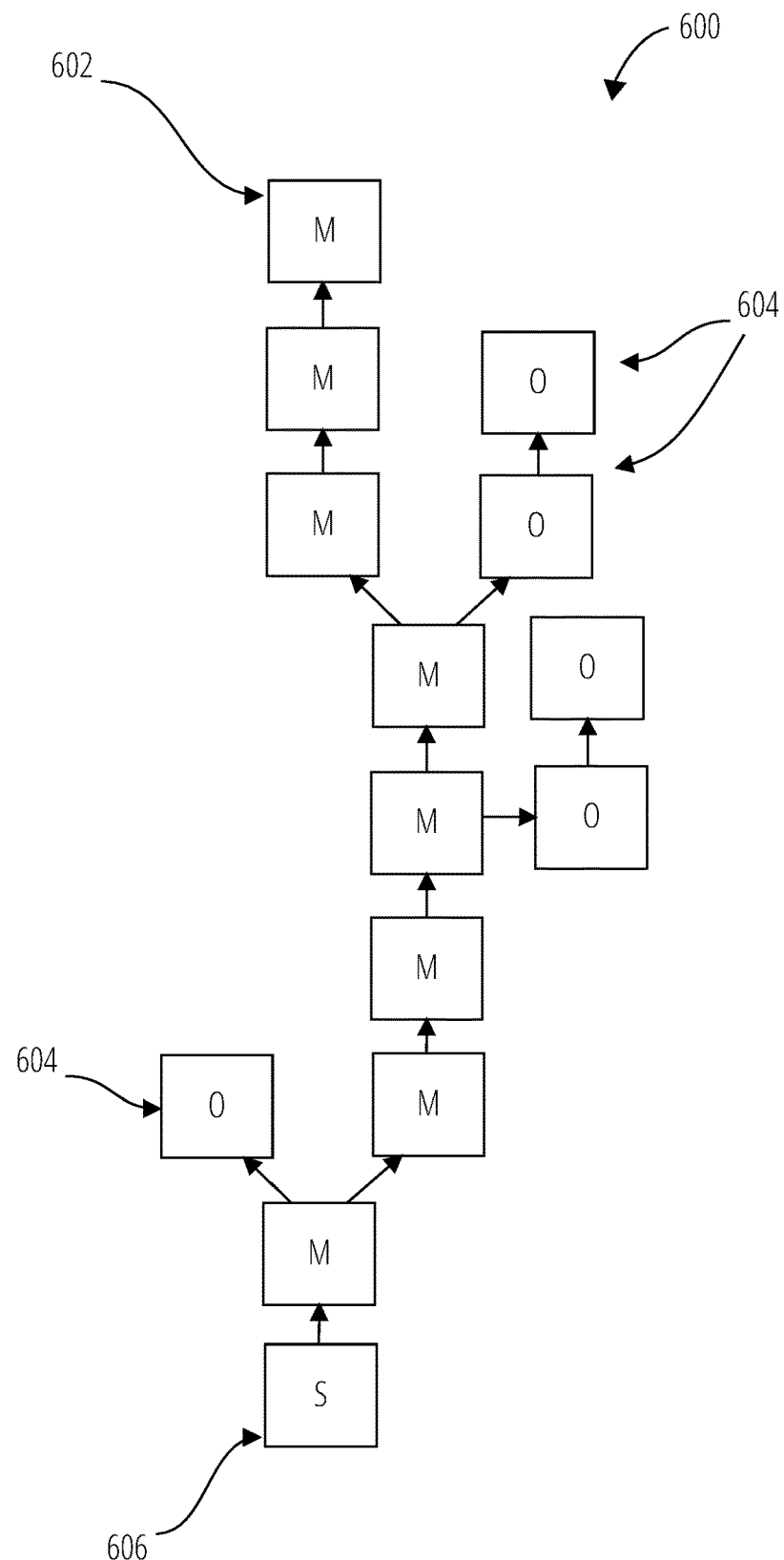
FIG. 6 depicts a distributed electronic ledger 600 in accordance with one embodiment.

FIG. 6 depicts an exemplary embodiment of a distributed electronic ledger 600. The mainchain 602 (M blocks) comprises the longest series of blocks from the start block 606 (S block) to the current block. Orphan blocks 604 (O blocks) exist outside of the main chain.

Blocks hold batches of valid transactions that are hashed and encoded, for example into a Merkle tree. Each block includes the cryptographic hash of the prior block in the distributed electronic ledger 600, linking the two. The linked blocks form a chain. This iterative process confirms the integrity of the previous block, back to the original start block 606.

Sometimes separate blocks can be produced concurrently, creating a temporary fork. In addition to a secure hash-based history, the distributed electronic ledger 600 may utilize a specified algorithm for scoring different versions of the history so that one with a higher value may be selected over others. Blocks not selected for inclusion in the mainchain 602 (e.g., rejected bids) are called orphan blocks 604.

As noted previously, multiple versions of the distributed electronic ledger 600 may be stored for redundancy, reliability, and security. Devices storing versions of the distributed electronic ledger 600 (e.g., each of the digital front ends in a group of printing systems), herein referred to as 'peers, may have different versions of the history from time to time. They may retain the highest-scoring version of the distributed electronic ledger 600 known to them. Whenever a peer receives a higher-scoring version (usually the old version with a single new block added) they extend or overwrite their local version of the distributed electronic ledger 600 and retransmit the improvement to their peers.

The distributed electronic ledger 600 may be designed to add the score of new blocks onto old blocks and provide incentives (e.g., by policy enforcement) to work on extending with new blocks rather than overwriting old blocks. Therefore the probability of a transaction block becoming superseded goes down exponentially as additional blocks are built on top of it, eventually becoming very low. For example, in a distributed electronic ledger using the proof-of-work system, the chain with the most cumulative proof-of-work is considered the valid one by the network. There are a number of methods that can be used to demonstrate a sufficient level of computation. Within a distributed electronic ledger the computation is carried out redundantly rather than in the traditional segregated and parallel manner.

Figure 7:
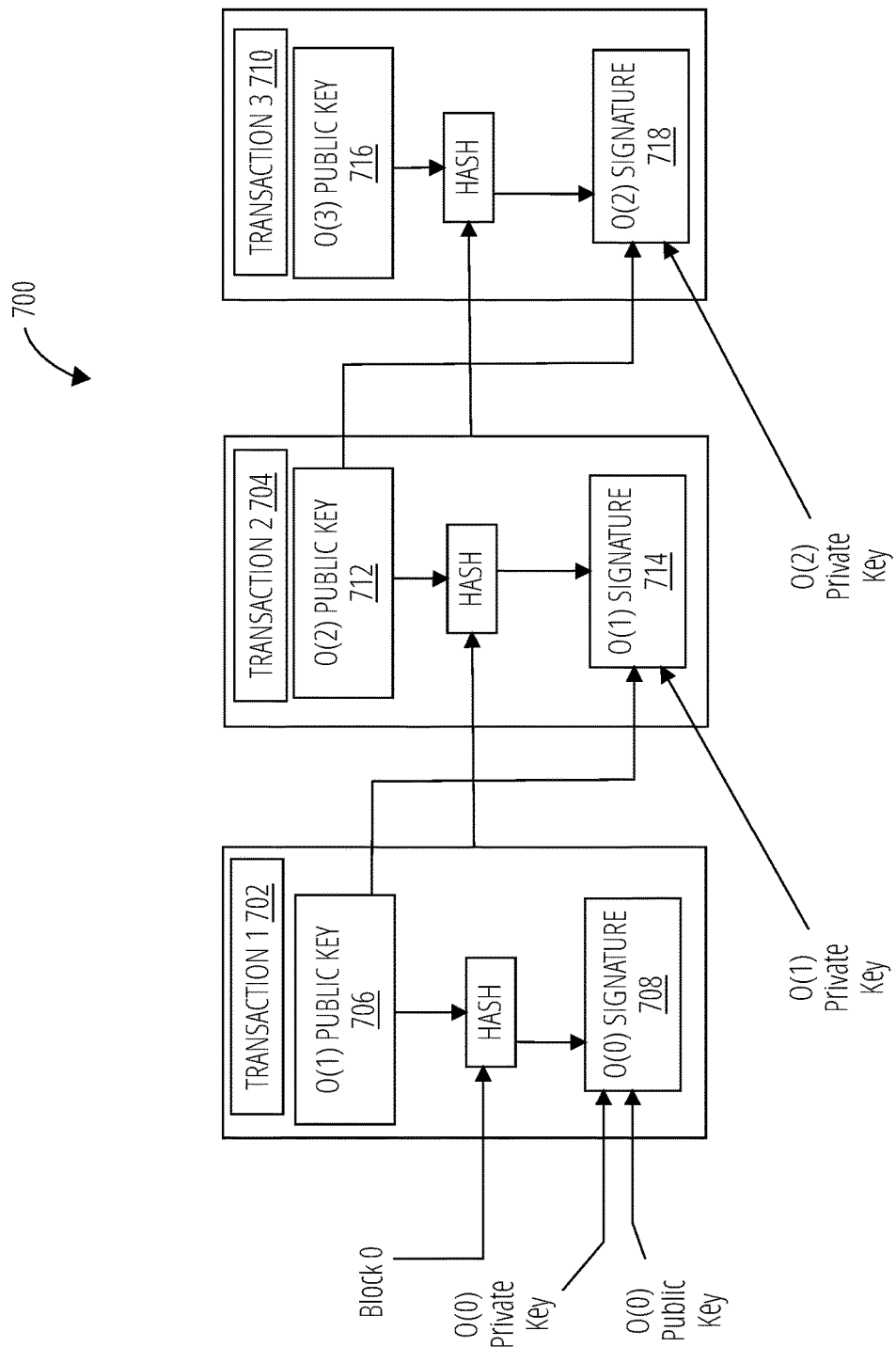
FIG. 7 depicts distributed electronic ledger blocks 700 in accordance with one embodiment.

FIG. 7 depicts an embodiment of irreversible distributed electronic ledger blocks 700. The distributed electronic ledger blocks 700 form a sequence of digitally signed transactions (transaction 1 702, transaction 2 704, and transaction 3 710 etc.). Each transaction includes the current owner's public key (block 1 owner public key 706, block 2 owner public key 712, and block 3 owner public key 716 respectively) and the previous owner's signature (O(0) signature 708, O(1) signature 714, and O(2) signature 718) which are generated using a hash function. The owner of a transaction may examine each previous transaction to verify the chain of ownership. Unlike traditional check endorsements, the transactions in the distributed electronic ledger blocks 700 are irreversible, which mitigates fraud.

Machine Embodiments

Figure 8:
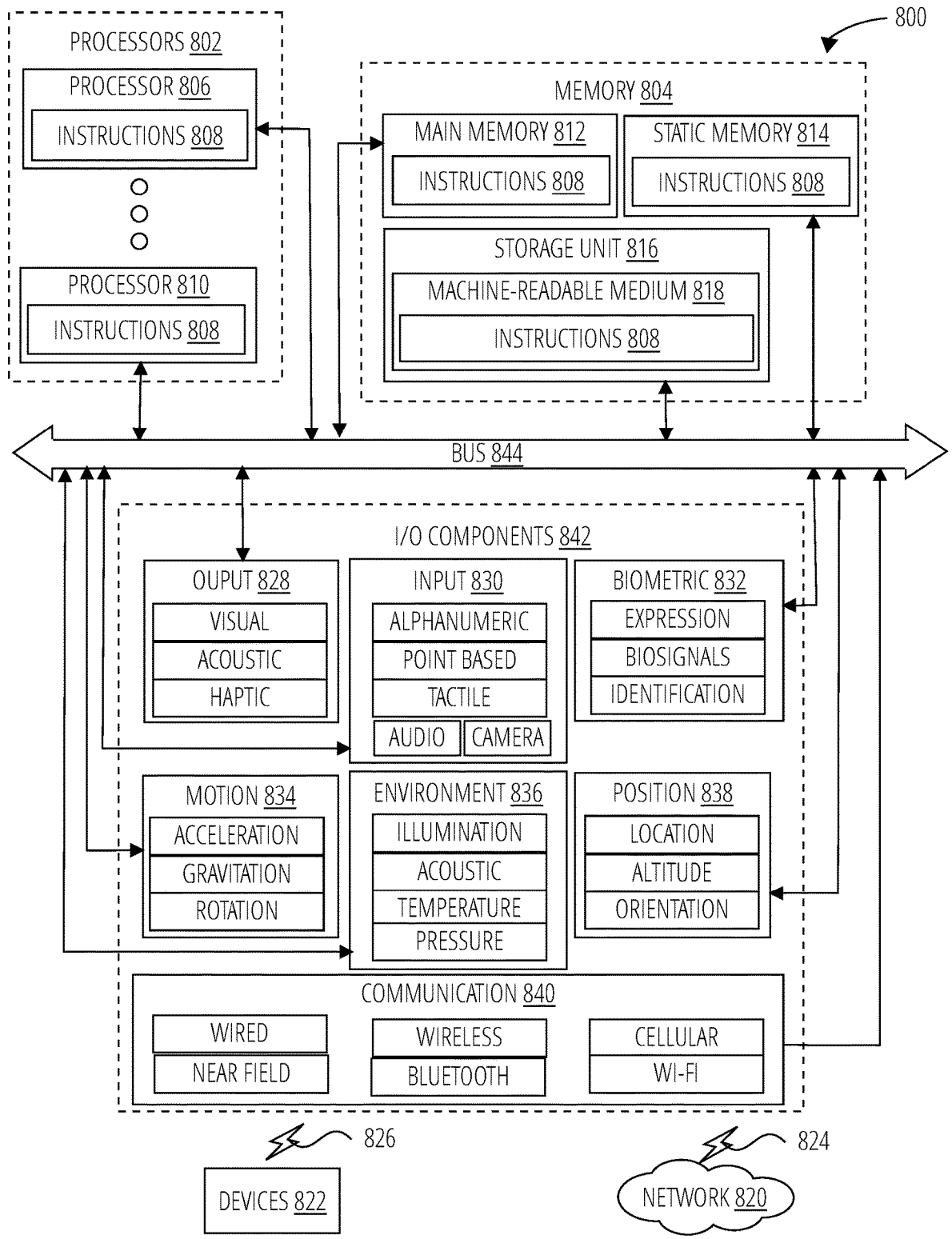
FIG. 8 depicts a digital front end 800 in the form of a computer system within which a set of instructions may be executed to perform any one or more of the methodologies discussed herein, according to an example embodiment.

FIG. 8 depicts a diagrammatic representation of a digital front end 800 in the form of a computer system within which logic may be implemented to perform any one or more of the functions or methods disclosed herein (e.g., for self-organizing distributed printing process 200, print job allocation process 300, print failure recovery process 400, or page range allocation process 500), according to an example embodiment. Embodiments of a print job server and print job originator may be implemented in like manner.

Specifically, FIG. 8 depicts a digital front end 800 comprising instructions 808 (e.g., a program, an application, an applet, an app, or other executable code) for causing the digital front end 800 to perform any one or more of the functions or methods discussed herein. For example, the instructions 808 may cause the digital front end 800 to to periodically poll a distributed electronic ledger for a print job. The instructions 808 may also cause the digital front end to negotiate with other printing systems for rights to print a page range of the print job, the negotiating performed exclusively on the distributed electronic ledger. The instructions 808 may also cause the digital front end to release all or part of the page range back to the distributed electronic ledger in response to a paper jam. The instructions 808 configure a general, non-programmed machine into a particular digital front end 800 programmed to carry out said functions and/or methods.

In alternative embodiments, the digital front end 800 operates as a standalone device or may be coupled (e.g., networked) to other machines. In a networked deployment, the digital front end 800 may operate in the capacity of a server machine or a client machine in a server-client network environment, or as a peer machine in a peer-to-peer (or distributed) network environment. The digital front end 800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 808, sequentially or otherwise, that specify actions to be taken by the digital front end 800. Further, while a single digital front end 800 is depicted, the term "machine" shall also be taken to include a collection of machines that individually or jointly execute the instructions 808 to perform any one or more of the methodologies or subsets thereof discussed herein.

The digital front end 800 may include processors 802, memory 804, and I/O components 842, which may be configured to communicate with each other such as via one or more bus 844. In an example embodiment, the processors 802 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 806 and processor 810) to execute the instructions 808. The term "processor" is intended to include multi-core processors that may comprise two or more independent processors (sometimes referred to as "cores") that may execute instructions contemporaneously. Although FIG. 8 depicts multiple processors 802, the digital front end 800 may include a single processor with a single core, a single processor with multiple cores (e.g., a multi-core processor), multiple processors with a single core, multiple processors with multiples cores, or any combination thereof.

The memory 804 may include one or more of a main memory 812, a static memory 814, and a storage unit 816, each accessible to the processors 802 such as via the bus 844. The main memory 812, the static memory 814, and storage unit 816 may be utilized, individually or in combination, to store the instructions 808 embodying any one or more of the functionality described herein. The instructions 808 may reside, completely or partially, within the main memory 812, within the static memory 814, within a machine-readable medium 818 within the storage unit 816, within at least one of the processors 802 (e.g., within the processor's cache memory), or any suitable combination thereof, during execution thereof by the digital front end 800.

The I/O components 842 may include a wide variety of components to receive input, provide output, produce output, transmit information, exchange information, capture measurements, and so on. The specific I/O components 842 that are included in a particular machine may depend on the type of machine. For example, portable machines such as mobile phones may include a touch input device or other such input mechanisms, while a headless server machine may not include such a touch input device. It may be appreciated that the I/O components 842 may include many other components that are not shown in FIG. 8. The I/O components 842 are grouped according to functionality merely for simplifying the following discussion and the grouping is in no way limiting. In various example embodiments, the I/O components 842 may include output components 828 and input components 830. The output components 828 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 830 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 842 may include biometric components 832, motion components 834, environmental components 836, or position components 838, among a wide array of possibilities. For example, the biometric components 832 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 842 may include communication components 840 operable to couple the digital front end 800 to a network 820 or devices 822 via a coupling 824 and a coupling 826, respectively. For example, the communication components 840 may include a network interface component or another suitable device to interface with the network 820. In further examples, the communication components 840 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 822 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as location via Internet Protocol (IP) geolocation, location via Wi-Fi® signal triangulation, location via detecting an NFC beacon signal that may indicate a particular location, and so forth.

Instruction and Data Storage Medium Embodiments

The various memories (i.e., memory 804, main memory 812, static memory 814, and/or memory of the processors 802) and/or storage unit 816 may store one or more sets of instructions and data structures (e.g., software) embodying or utilized by any one or more of the methodologies or functions described herein. These instructions (e.g., the instructions 808), when executed by processors 802, cause various operations to implement the disclosed embodiments.

As used herein, the terms "machine-storage medium," "device-storage medium," "computer-storage medium"

mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Communication Network Embodiments

In various example embodiments, one or more portions of the network 820 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 820 or a portion of the network 820 may include a wireless or cellular network, and the coupling 824 may be a Code Division Multiple Access (CDMA) connection, a Global System for Mobile communications (GSM) connection, or another type of cellular or wireless coupling. In this example, the coupling 824 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 808 and/or data generated by or received and processed by the instructions 808 may be transmitted or received over the network 820 using a transmission medium via a network interface device (e.g., a network interface component included in the communication components 840) and utilizing any one of a number of well-known transfer protocols (e.g., hypertext transfer protocol (HTTP)). Similarly, the instructions 808 may be transmitted or received using a transmission medium via the coupling 826 (e.g., a peer-to-peer coupling) to the devices 822. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 808 for execution by the digital front end 800, and/or data generated by execution of the instructions 808, and/or data to be operated on during execution of the instructions 808, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to any set of one or more components configured to implement functionality in a machine. Logic includes machine memories configured with instructions that when executed by a machine processor cause the machine to carry out specified functionality; discrete or integrated circuits configured to carry out the specified functionality; and machine/device/computer storage media configured with instructions that when executed by a machine processor cause the machine to carry out specified functionality. Logic specifically excludes software per se, signal media, and transmission media.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it may be apparent that modifications and variations are possible without departing from the scope of the invention as claimed. The scope of inventive subject matter is not limited to the depicted embodiments but is rather set forth in the following Claims.

What is claimed is:

1. A self-organizing distributed printing system, comprising:
   a plurality of printers;
   a distributed electronic ledger;
   a plurality of digital front ends coupled to the printers and configured to periodically poll the distributed electronic ledger for a print job;
   each digital front end comprising logic to:
      add a first bid block to the distributed electronic ledger, the first bid block requesting a first page range of the print job to be allocated to the digital front end for printing;
      add a first vote block to the distributed electronic ledger to approve or deny a second bid block for the first page range added to the distributed electronic ledger by other of the digital front ends; and
      release all or part of a second page range allocated to the digital front end back to the distributed electronic ledger in response to a print failure by a printer associated with the digital front end.

2. The self-organizing distributed printing system of claim 1, wherein releasing all or part of the second page range allocated to the digital front end back to the distributed electronic ledger in response to the print failure comprises the digital front end adding a page range release block for all or part of the page range allocated to the digital front end on the distributed electronic ledger.

3. The self-organizing distributed printing system of claim 2, each digital front end further comprising logic to:
   poll the distributed electronic ledger to detect a page range release block; and
   in response to detecting the page range release block, add a third bid block to the distributed electronic ledger for a third page range identified in the page range release block.

4. The self-organizing distributed printing system of claim 1, each digital front end further comprising logic to:
   add a page range completion block to the distributed electronic ledger in response to completion of printing of the page range allocated to the digital front end; and
   add a third bid block to the distributed electronic ledger for an additional page range of the print job to be allocated to the digital front end for the printing.

5. The self-organizing distributed printing system of claim 1, each of the digital front ends further comprising logic to:
   poll the distributed electronic ledger to identify at least one vote block added by the other digital front ends indicating that the other digital front ends approve the bid block requesting a page range of the print job to be allocated to the digital front end for printing.

6. The self-organizing distributed printing system of claim 1, wherein the distributed electronic ledger comprises a single mainchain without sidechains.

7. The self-organizing distributed printing system of claim 1, the distributed electronic ledger comprising a job definition block defining constraints on page ranges that may be bid on by the plurality of digital front ends.

8. The self-organizing distributed printing system of claim 7, the constraints comprising minimum and maximum page counts.

9. The self-organizing distributed printing system of claim 7, the constraints comprising price constraints.

10. The self-organizing distributed printing system of claim 7, the constraints comprising completion time constraints.

11. A self-organizing distributed printing process, comprising:
   adding a print job definition block to a distributed electronic ledger by a job originator;
   polling the distributed electronic ledger for the print job definition block by a plurality of printing systems;
   bidding on the distributed electronic ledger for page ranges of the print job by the plurality of printing systems, wherein the bidding occurs between the plurality of printing systems by adding, approving, and denying bid blocks on the distributed electronic ledger;
   allocating the page ranges of the print job among the plurality of printing systems based on an outcome of the bidding;
   canceling, on the distributed electronic ledger, at least part of a page range acquired by the bidding by one or more of the plurality of printing systems;
   identifying a canceled at least part of the page range by polling of the distributed electronic ledger by the one or more of the plurality of printing systems; and
   responding to the canceled at least part of the page range by reinitiating bidding, on the distributed electronic ledger, for the canceled at least part of the page range by the one or more of the plurality of printing systems.

12. The self-organizing distributed printing process of claim 11 wherein canceling of the at least part of the page range acquired by the bidding occurs in response to a paper jam by a printing system that acquired the page range by the bidding.

13. The self-organizing distributed printing process of claim 11, further comprising:
   responding to canceling of less than an entire page range by reinitiating, on the distributed electronic ledger, bidding for the entire page range by the one or more of the plurality of printing systems.

14. The self-organizing distributed printing process of claim 11, further comprising:
detecting, by the job originator polling the distributed electronic ledger, a bidding deadlock among one or more of the plurality of printing systems; and
breaking the bidding deadlock by the job originator adding a page range assignment block to the distributed electronic ledger.

15. The self-organizing distributed printing process of claim 11, further comprising:
detecting on the distributed electronic ledger a bidding deadlock among one or more of the plurality of printing systems; and
resolving the bidding deadlock via a contention resolution process among the one or more of the plurality of printing systems causing the bidding deadlock, wherein the contention resolution process does not involve the job originator.

16. The self-organizing distributed printing process of claim 11, further comprising:
adding a page range completion block to the distributed electronic ledger, by one or more of the plurality of printing systems, in response to completion of printing of a page range acquired by the one or more of the plurality of printing systems;
adding a job completion block to the distributed electronic ledger, by the job originator, in response to detecting page range completion blocks on the distributed electronic ledger for all page ranges of the print job.

17. A system comprising:
a printer; and
logic configured to:
periodically poll a distributed electronic ledger for a print job;
negotiate via the distributed electronic ledger with a plurality of printing systems for rights to print a page range of the print job, the negotiating performed exclusively on the distributed electronic ledger, wherein negotiating with the plurality of printing systems for the rights to print the page range of the print job comprises adding a bid block to the distributed electronic ledger and reading vote blocks for the bid block placed on the distributed electronic ledger by the plurality of printing systems; and
release all or part of the page range back to the distributed electronic ledger in response to a print failure of the page range by the printer.

18. The printing system of claim 17, the logic further configured to:
add a page range completion block to the distributed electronic ledger in response to completion of printing of the page range; and
on condition that the print job is incomplete after adding the page range completion block, add a bid block to the distributed electronic ledger to print an additional page range.

19. The printing system of claim 17, wherein the print failure is a paper jam.

* * * * *